T. F. MULLANEY.
SAFETY LOCKING DEVICE FOR FIRE PAILS AND OTHER ARTICLES.
APPLICATION FILED MAY 6, 1908.

920,368.  Patented May 4, 1909.

WITNESSES
A. C. Abbott
V. E. Markmann

INVENTOR
Thomas F. Mullaney
BY Griffin & Bernhard
ATTORNEYS

UNITED STATES PATENT OFFICE.

THOMAS F. MULLANEY, OF NEW YORK, N. Y.

SAFETY-LOCKING DEVICE FOR FIRE-PAILS AND OTHER ARTICLES.

No. 920,368.  Specification of Letters Patent.  Patented May 4, 1909.

Application filed May 6, 1908. Serial No. 431,075.

*To all whom it may concern:*

Be it known that I, THOMAS F. MULLANEY, a citizen of the United States, residing in the city of New York, borough of Manhattan, county and State of New York, have invented a certain new and useful Safety Locking Device for Fire-Pails and other Articles, of which the following is a specification.

This invention is a device intended for use in conjunction with a fire pail, or other article, in order to prevent the surreptitious removal and use of such pail or article without detection.

The fire underwriters and inspectors, in many localities, require that pails or buckets containing water, sand or other fire extinguishing agent, be kept in view and readily accessible for use in case of fire. Experience shows, however, that when the pails are suspended on ordinary hooks, as is customary, workmen and others will carry them off, mainly for temporary use for other purposes, but through forgetfulness, or other cause, will not return them.

The object of the present invention is to check or prevent such practice, and, with this object in view, the invention consists of an attachment or device to be applied to, or used in conjunction with, a pail, or other article, in order to prevent the same from being taken away and returned, without revealing that it was dislodged from its normal location.

The preferred form of the invention is embodied in a hook, or other support, provided with a readily and easily destructible member or element, preferably of a frangible or fragile character, to lock a pail, or other article, in place thereon, and which frangible member must be broken, or disrupted, before the pail can be removed.

The frangible member or element is usually composed of glass, in the form of a tube or rod, which, preferably, is introduced into openings or recesses in the hook, or other support, and subsequently secured or locked in place by means of any well known cement, where it is intended to remain until it is desired to remove the pail from the hook, whereupon it is broken, or fractured in the act of removing the article from the hook or support.

In the accompanying drawings, I have illustrated one practical embodiment of the invention, but the construction shown therein is to be understood as illustrative only, and not as defining the limits of the invention.

Figure 1:
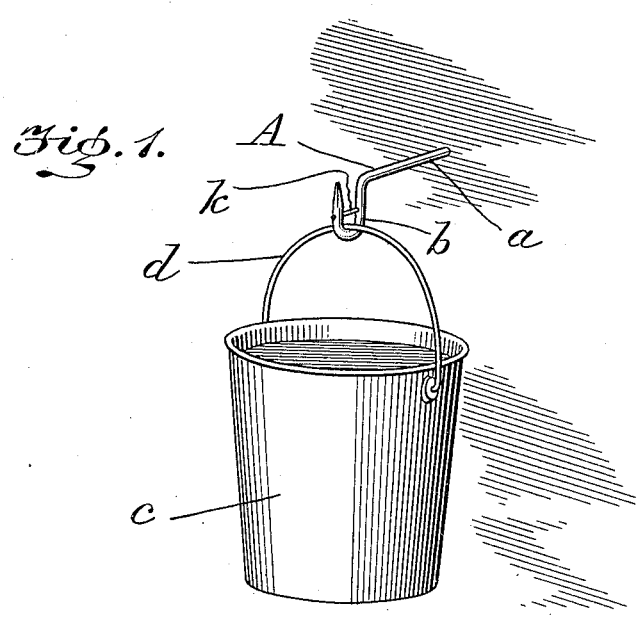
Figure 2:
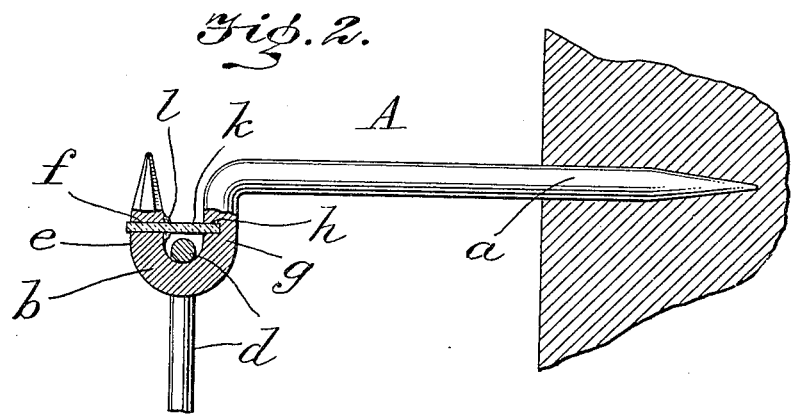

Figure 1 is a perspective view of the device showing a pail locked in position thereon, and Fig. 2 is an enlarged view, partly in section, showing the preferred manner of securing the destructible or frangible member in its locked position.

The hook, A, is composed, as usual, of the shank or driving end, $a$, and the hook proper, $b$. A pail, $c$, is shown as suspended thereon, through the medium of the bail $d$. One prong, $e$, of the hook may be provided with an opening $f$, which may be produced therein by drilling or otherwise, and the other member, $g$, of said hook may be provided with a recess, $h$. The destructible or frangible member, $k$, preferably of glass and in the form of a tube or rod, may be passed through opening, $f$, and one end extended into the recess, $h$. When thus placed in position, it may be retained or fixed therein by means of any suitable cement, preferably applied as indicated at $l$, or in any other obvious manner.

The manner of using the device will be apparent from the foregoing description of its construction, but it may be described, briefly, as follows: The pail having been suspended on the hook, the locking member, $k$, is inserted in position, and secured therein by cement, or otherwise, as described. When it is desired to use the pail, the member, $k$, is disrupted, or broken, in any manner desired, as *e. g.*, by bringing the bail, $d$, up against it, whereupon the pail may be detached from the hook. The pail, after use, may be replaced on the hook and again locked in position by a new locking member.

The locking member is preferably composed of material which would not, ordinarily, be accessible to workmen, or others, especially in the form used, and, consequently, there would be little liability of the pail being removed and relocked in position without detection.

It will be manifest that the device is not only capable of use for the purposes described, but it has various other fields of usefulness, such as for securing pictures, valuable articles of wearing apparel, etc., in place and against surreptitious removal.

I am aware that it is common to provide various receptacles with a part or section, in the walls thereof, more easily destructible than the remainder of such receptacle, whereby the contents of the receptacle are made readily accessible, but it will be apparent that devices of this character differ in principle, construction and mode of operation from my invention.

Having thus fully described the invention, what I claim as new, and desire to secure by Letters Patent is:

1. In a device of the class described, a suitable supporting member, and an easily destructible non-supporting member cemented to said supporting member and adapted to temporarily lock an article in place thereon while said easily destructible member remains intact, said non-supporting member being normally out of engagement with the article to be locked in place.

2. In a device of the class described, a suitable supporting member, and a frangible locking member secured thereto above the line of support on said supporting member, whereby an article may be locked on the supporting member below the locking member.

3. A supporting hook, having a frangible member adapted to temporarily lock an article in place on said hook.

4. A supporting hook provided with a bearing within which to loosely insert a frangible member, a frangible member located in said bearing and means for locking the frangible member to the hook.

5. In a device of the class described, a supporting hook and a glass rod secured thereto above the point of support of the hook and serving to lock an article in place thereon.

6. In a device of the class described, a supporting hook having a replaceable member serving as a temporary lock and which member is readily destructible.

In testimony whereof I have signed my name to this specification in the presence of two subscribing witnesses.

THOMAS F. MULLANEY.

Witnesses:
Wm. A. Low,
Walter J. Quinn